Patented July 23, 1935

2,009,240

UNITED STATES PATENT OFFICE 2,009,240

WELDING ROD

Aubrey Thomas Roberts and John Hamilton Paterson, Walthamstow, London, England, assignors to American Murex Corporation, New York, N. Y., a corporation of Delaware No Drawing. Application December 6, 1932, Serial No. 645,946

9 Claims. (Cl. 219—8)

This invention relates to welding of metals; and it comprises processes of welding metals, and particularly ferrous metals, by means of metal welding rods or wire, wherein welding is effected in the presence of a finely divided electrically conductive metal usually as a coating of substantial thickness shielding said rod from the air, said electrically conductive metal preferentially reacting with air; and it further comprises novel means utilizable in such processes, said means comprising a welding rod, usually of ferrous metal, provided with an electrically conductive coating of substantial thickness containing finely divided metal capable of preferentially reacting with the air and its constituents and of protecting the welding rod and the metal to be welded from attack by air, said coating advantageously being a composition containing powdered or granular iron and bonded to said welding rod by means of adhesives; all as more fully hereinafter set forth and as claimed.

Electric arc welding of metals, particularly ferrous metals, is well known and much used. By such welding processes, various metal articles may be fabricated and united. In such processes welding rods or wire, usually of ferrous materials, are made part of an electric circuit with the article to be welded and the welding is effected by striking an arc between the welding rod and the material to be welded and united. The heat of the arc causes the metal to flow from the welding rod through the arc to the metal article. Unfortunately, in welding with bare rods the metal of the weld is lacking in strength and ductility and has poorer mechanical properties than is desired in satisfactorily welded articles. The welding metal often has the properties of low grade cast metal and is inferior to the high grade worked metal on either side.

The usual processes of electric arc welding are inherently defective in that the hot metal flowing from the welding rod in passing through the arc combines with or occludes certain constituents of the surrounding atmosphere. This influences the strength and ductility of the weld metal and in a large measure is responsible for the poor mechanical properties of these welds. Presumably not only the oxygen of air but also the nitrogen and other constituents attack the hot metal during welding, causing these undesirable results. As is well known, both oxygen and nitrogen in metallic iron cause a lessening in strength and other undesirable properties.

We have found that better results can be obtained in welding with production of better weld metal, if there be present during the operation iron in such a form that it will preferentially react with air gaining access, thereby shielding the welding rod proper. Usually, we employ extra iron in the form of a powder which carries part of the electrical current and forms part of the weld.

In one embodiment of our invention the iron core of a welding rod or wire is coated with powdered or granular iron, using binders, such as glue, gum resins, synthetic resins, water-glass, etc. if desired. Coating may be by extrusion, dipping or otherwise. One satisfactory way is to apply the composition to the core between the turns of a fiber yarn wrapped around it.

For the best results and to secure adequate protection it is desirable that the amount of powdered iron be not below a certain proportion to the weight of the core rod. For example, in the case of a steel core for welding rods, it is desirable to coat it with at least 15 per cent of iron powder; that is, 15 parts of iron powder for every 100 parts of steel core.

In covering a steel or iron core with an electrically conductive coating of iron powder, desirable results are obtained. Still better results may be obtained by, so to speak, activating the iron powder with minor admixtures of other metals. For example, the iron powder mixed with ferro-manganese or the like in amount sufficient to give 6 per cent of manganese gives good results. With this mixture 10 per cent of the weight of the core rod will suffice to give the effect of 15 per cent of iron alone.

In a general way, the finer the particle size of the protective powdered metal used, within reasonable limits, the more effective is the protection secured. However, satisfactory results are obtained with any particle size which can be applied practically as an electrically conductive coating.

It is not necessary that the iron powder be free of mineral matter, and indeed it is sometimes advantageous to mix it with substances of colloidal or semi-colloidal fineness such as china clay or colloidal silica in a small proportion. A typical or desirable composition of this character is made from 90 parts by weight of fine iron filings, 5 parts manganese powder and 5 parts of china clay. This may be made into a paste with sodium silicate solution (waterglass) and applied in any desired way.

We regard as our invention the interposition between the body of the welding rod and the atmosphere of a substantial amount of a more attackable metal, usually powdered iron, in quantity more than sufficient to react with the air gaining access to the hot welding metal. Some of the results of our invention may be secured, though not in a simpler way, if the powdered iron be applied to the part to be welded rather than to the welding rod itself. It is, for example, possible to plaster a powdered iron composition around the part to be welded. Somewhat the same results are obtained by providing the welding rod with thin projecting readily attackable fins, as by drawing the core wire through special dies to produce thin radial fins.

While powdered iron is regarded as the best and the most convenient metal to be used in the present invention, other finely divided metals capable of combining with or taking up the oxygen or nitrogen of the air may be used, as for example, powdered aluminum, manganese, titanium or silicon, which might be used either in elementary form or as ferro alloys.

Welding rods or electrodes under the present invention can be made in long lengths, since the finely divided metallic coating not only has the advantage of shielding the rod against contact with air but the further and great advantage that it is electrically conductive and, therefore, adapts itself to use in continuous lengths in automatic welding machines. The coating being electrically conductive carries part of the current for welding and helps to form the arc, with the result that metal from the coating forms part of the metal of the weld.

While the present invention is regarded as most applicable and advantageous in the case of ferrous metal rods to be used in arc welding or repairing or otherwise treating ferrous metals, its application is not restricted thereto, since some measure of its advantage can be obtained in protecting non-ferrous welding rods, such as copper, bronze, brass, aluminum, etc.; the welding rod in each case being protected with an electrically conductive coating of finely divided metal. In most cases, this finely divided metal is the same as that of the welding rod, but it is not necessarily so. For example, fine silicon, aluminum, etc., may be used as the protective metal, both for ferrous metal welding rods and for non-ferrous welding rods.

Inherent in the use of a powdered iron coating applied to the iron core rod in amounts sufficient to form a substantial part of the weld metal is the advantageous result that vertical and overhead welding is facilitated and improved by the action of the additional metal deposited in the weld from the coating; this added metal having the effect of reducing the fluidity of the weld by reason of its cooling action in melting with the result of keeping the weld metal in position in fillets, vertical, overhead and inclined welds. This result follows from coating the iron core rod with powdered iron in amounts of 15 per cent or more of the weight of the core rod.

What we claim is:

1. As an article of manufacture, a metal welding rod or wire core carrying an electrically conductive coating containing as a major constituent powdered metal of substantially the same composition as the core metal and in a relative quantity sufficient to form a substantial part of the weld and to protect the metal from the action of air gaining access to the metal.

2. As an article of manufacture, a ferrous metal welding rod or wire carrying an electrically conductive coating containing as a major constituent powdered metallic iron in a relative quantity sufficient to form a substantial part of the weld and to protect the metal during welding from the action of air gaining access to the metal.

3. As an article of manufacture, a ferrous metal welding rod or wire carrying an electrically conductive coating containing as a major constituent powdered metallic iron in a relative quantity not less than 15 per cent of the welding metal.

4. As an article of manufacture, ferrous metal welding rod or wire carrying an electrically conductive coating containing as a major constituent a mixture of powdered iron and a minor proportion of another powdered metal in a relative quantity sufficient to form a substantial part of the weld and to protect the metal during welding from the action of air gaining access to the metal.

5. As an article of manufacture, ferrous metal welding rod or wire carrying an electrically conductive coating containing as a major constituent a mixture of powdered iron and a minor proportion of another powdered metal in a relative quantity sufficient to form a substantial part of the weld and to protect the metal during welding from the action of air gaining access to the metal, said coating metals being bonded in place with admixed china clay.

6. As an article of manufacture, ferrous metal welding rod or wire carrying an electrically conductive coating comprising as a major constituent a bonded mixture of powdered iron and ferromanganese in a ratio giving about six per cent manganese reckoned on the powdered iron, said iron-manganese mixture being in a relative quantity not less than 10 per cent of the welding rod.

7. As an article of manufacture, an arc welding electrode consisting of an iron core rod or wire provided with a protective coating containing as a major constituent powdered metallic iron in an amount equal to 15 per cent or more of the weight of the core metal.

8. As an article of manufacture, an arc welding electrode consisting of a metal core rod or wire provided with a protective coating containing as a major constituent powdered metal of substantially the same composition as the core metal and in an amount equal to 15 per cent or more of the weight of the core metal.

9. As an article of manufacture, an arc welding electrode consisting of a metal core rod or wire provided with a protective coating containing as a major constituent powdered metal of substantially the same composition as the core metal and in amount sufficient to supply a substantial part of the metal of the weld.

AUBREY THOMAS ROBERTS.
JOHN HAMILTON PATERSON.